(12) United States Patent
Birk

(10) Patent No.: US 6,363,883 B1
(45) Date of Patent: Apr. 2, 2002

(54) ANIMAL RELATED APPARATUS

(75) Inventor: Uzi Birk, Huddinge (SE)

(73) Assignee: Alfa Laval Agri AB, Tumba (SE)

( * ) Notice: Subject to any disclaimer, the term of this patent is extended or adjusted under 35 U.S.C. 154(b) by 0 days.

(21) Appl. No.: 09/462,513

(22) PCT Filed: Jul. 7, 1998

(86) PCT No.: PCT/SE98/01336

§ 371 Date: Jan. 25, 2000

§ 102(e) Date: Jan. 25, 2000

(87) PCT Pub. No.: WO99/03064

PCT Pub. Date: Jan. 21, 1999

(30) Foreign Application Priority Data

Jul. 7, 1997 (SE) .............................................. 9702628

(51) Int. Cl.$^7$ ................................................. A01J 5/00
(52) U.S. Cl. ................................................. 119/14.08
(58) Field of Search ........................... 119/14.02, 14.08, 119/14.1, 14.18

(56) References Cited

U.S. PATENT DOCUMENTS 4,867,103 A    9/1989 Montalescot et al.
5,042,428 A *  8/1991 Van der Lely et al. ... 119/14.08
5,934,220 A *  8/1999 Hall et al. ................ 119/14.08
6,189,486 B1 * 2/2001 Lindholm ................ 119/14.02

FOREIGN PATENT DOCUMENTS

EP    0774204       5/1997
WO    WO 9316439    8/1993

* cited by examiner

Primary Examiner—Peter M. Poon
Assistant Examiner—Kevin Jakel
(74) Attorney, Agent, or Firm—Weingarten, Schurgin, Gagnebin & Lebovici LLP

(57) ABSTRACT

An animal related apparatus is provided for automatically performing an animal related operation, comprising a robot arm (4), a camera means (8) provided with at least one lens and a light source means (6). According to the invention, said camera means (8) is arranged on said robot arm (4); the light source means (6) is arranged in relation to said camera means (8) such that an object to be viewed is illuminated from substantially the same direction as it is viewed; and said light source means (6) is a flash light means adapted to supply at least one short, intensive light flash for illumination of a part of an animal to be viewed by said camera means.

18 Claims, 4 Drawing Sheets

ANIMAL RELATED APPARATUS

TECHNICAL FIELD

The present invention relates to an animal-related apparatus for automatically performing an animal-related operation, comprising a robot arm, a camera means provided with at least one lens and a light source means.

It also relates to a method of performing an animal related operation including such an animal related apparatus.

Such an animal related apparatus and such a method are previously known from EP-A-0 300 115, in which apparatus a camera is mounted on the floor, whereas said light source means is arranged on the side of the milking stall, i.e. the light beam the light source means and the lens of the camera are more or less perpendicular to one another. This illumination has the purpose of intentionally creating shadows of the teats on the udder, which shadows are to be viewed by the camera for finding the teats, instead of viewing the teats directly.

Other animal related apparatuses for finding teats of an animal to be milked are known from US-A-4 867 103, in which a laser sensor is utilised and EP-A-300 582, in which an ultrasonic sensor is used.

OBJECT OF THE INVENTION

None of the above techniques have proven to be fail safe. On the contrary, animals having e.g. narrowly disposed are sometimes difficult to separate for the known systems, as such teats may be considered as one teat by the kind of technique used for finding the teats.

It is, accordingly, an object of the invention to provide an animal related apparatus, which more sufficiently and precisely finds the teats of an animal for allowing animal related operations to be performed to the animal.

SUMMARY OF THE INVENTION

This has been solved by an apparatus of the initially defined kind, which is characterised terised in that said camera means is arranged on said robot arm;

the light source means is arranged in relation to said camera means that an object to be viewed is illuminated from substantially the same direction as it is viewed; and in that said light source means is a flash light means adapted to supply at least one short, intensive light flash for illumination of a part of an animnal to be viewed by said camera means.

It has also been solved by a method of the initially defined kind, which is characterised by the following sequence:

directing said camera means and said light source means towards a part of an animal by means of said robot arm;

controlling said light source means to supply at least one short, intensive light flash;

analysing a captured image for establishing the position of said part of the animal;

moving said robot arm at least partly towards said part of the animal;

performing an animal related operation in case the part of the animal has been safely identified; and in case the robot arm has moved sufficiently close to the part of the animal to allow said animal related operation to be performed.

By the apparatus and the method, a high-resolution image with sharp contours is achieved, which image highly facilitates finding e.g. the teats by image analysis and subsequent performance of said animal related operation.

Suitably, said light source means is arranged on the robot arm. Hereby, the relation of the direction of the light beam and the direction of the lens of the camera is easy to keep constant. It should however be noted that the light source means may be arranged e.g. on a basement of the animal related apparatus or on a post, as long as the said directions are kept in substantially the same.

Preferably, said light source means is adapted to supply a plurality of light flashes in a sequence. In particular, said sequence is repeated until the part of the animal has been safely identified and until the robot arm has moved sufficiently close to the part of the animal to allow said animal related operation to be performed. Hereby, a sequential movement towards e.g. a teat is possible to be performed, i.e. after illumination, the image is analysed and the robot arm is moved towards the teat. A new flash illuminates the teat and after image analysis, the robot arm is allowed to move further etc.

Suitably, said light source means is provided with a reflector for providing a directed light beam. Hereby, it is possible to illuminate only a desired part of the animal. Furthermore, by using different kinds of reflectors, it is possible to adapt the light beam to the focal length of the lens of the camera.

Preferably, said light source means is of a substantially annular shape for initially forming a substantially annular light beam. Hereby, it is possible to create an image of a part of a protruding part, such as a teat seen from underneath, which image is free of shadows.

Suitably, at least one laser line is projected onto said part of the animal, for illumination thereof. Hereby, it is possible to use a laser sensing technique before and/or after a flash has illuminated the teat. Alternatively, a steady light is followed by a flash, which in turn is followed by steady light. Accordingly, a combination of at least two kinds of image analysis are utilised, as a combination of sensing techniques enhances accuracy.

Preferably, an image capture means is associated with a shape recognition means. Suitably, said shape recognition means is adapted to identify said part of the animal by contour analysis. Hereby, it is possible to quickly recognise, identify and establish the orientation of e.g. a teat.

Suitably, at least a part of said robot arm is adapted to bias a teatcup to an orientation substantially similar to that of an inclined teat. Hereby, a safer teatcup attachment is achieved.

DRAWING SUMMARY

DETAILED DESCRIPTION OF THE INVENTION

Figure 1:
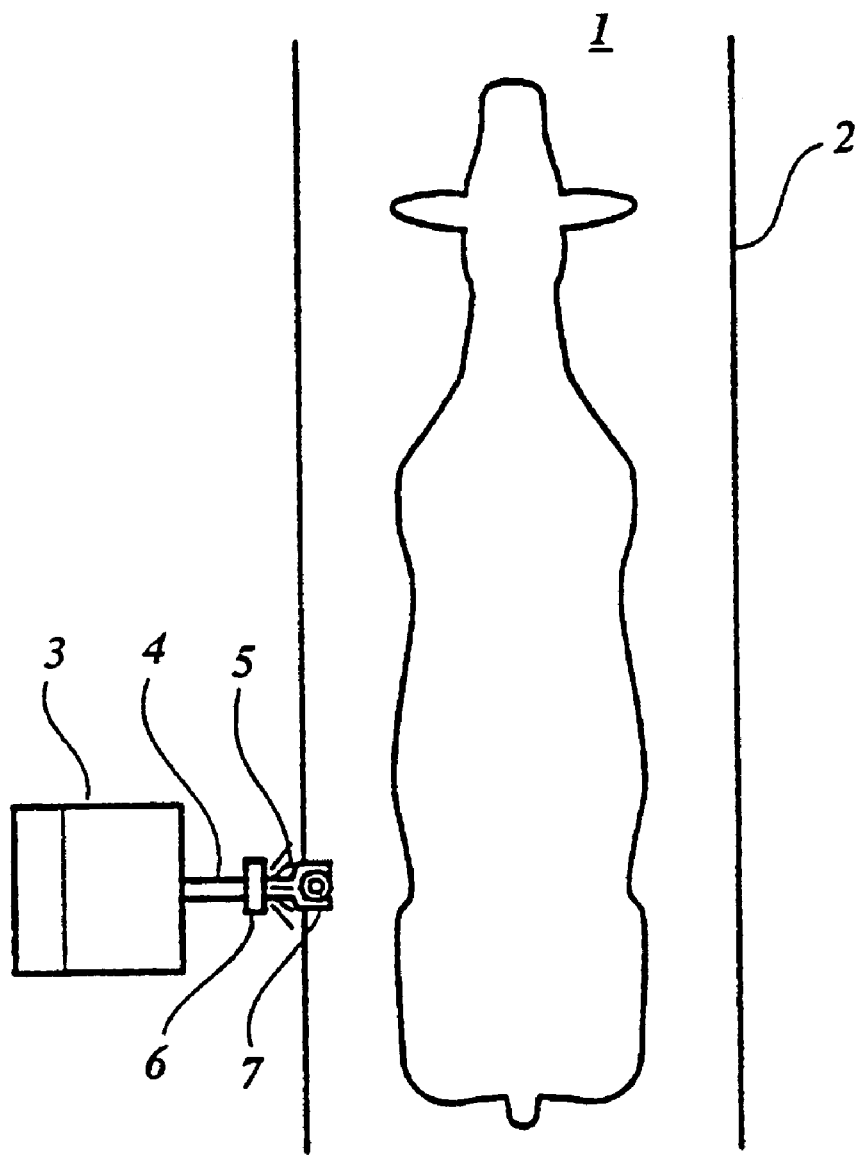
FIG. 1 is a top view of a cow in an animal space provided with an animal related apparatus.

FIG. 1 shows schematically a cow in an animal space 1, such as a milking stall, a feeding stall, a gateway or an animal treatment stall, defined at its sides by a sideward limiting means 2, such as a wall or a railing.

An animal related apparatus 3 is provided at the animal space 1. A robot arm 4 arranged on the apparatus is provided to perform animal related operations by means of a handling means 5 provided with rigid or movable shackles. The robot arm is furthermore provided with a light source means 6, in the form of a flash and a camera (see FIG. 2, reference numeral 8). The handling means 5 shown in FIG. 1 holds a teatcup 7 in its handling means 5.

Figure 2:
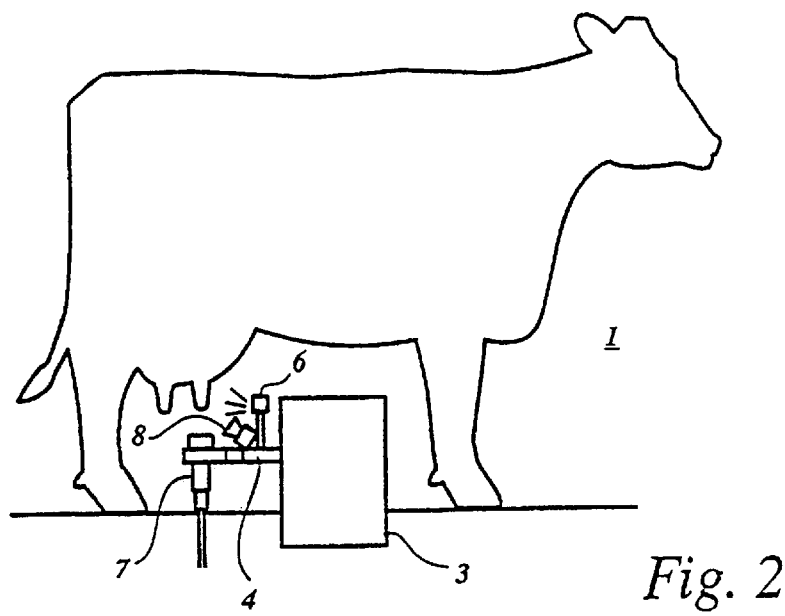
FIG. 2 is a side view of a cow in an animal space provided with an animal related apparatus.

FIG. 2 illustrates schematically said animal related apparatus as shown in FIG. 1, but from the side. In this figure is shown a camera 8, which views a teat from substantially the same direction as the light source means 6 illuminates the teat.

Figure 3:
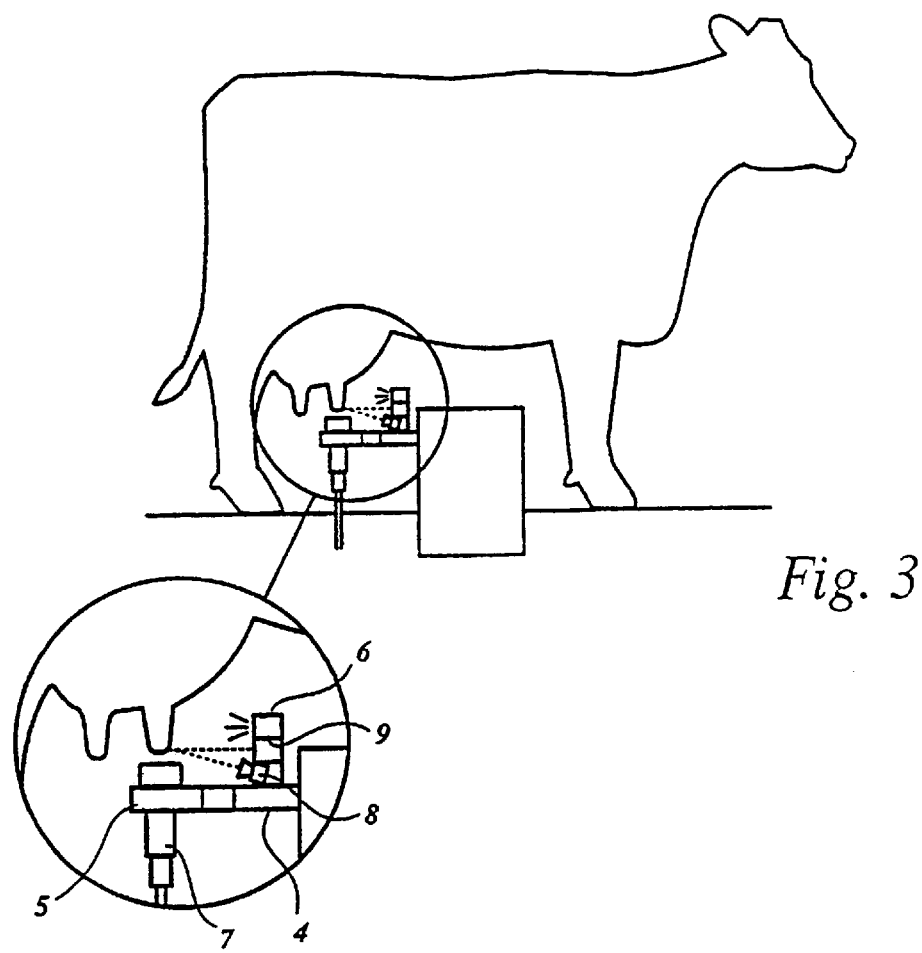
FIG. 3 is a side view of a cow in an animal space provided with an animal related apparatus according to a further embodiment.

FIG. 3 illustrates schematically another embodiment of the apparatus shown in FIG. 1, including a flash for illuminating the teat by a short, intensive light beam, and a laser emitter 9 for illuminating the teat by one or several laser lines.

When the camera 8 views one or several teats while the teats are illuminated by a laser line, the camera captures an image, which is dominated by the lines viewed by the camera, as the resolution of the teats is poor due to lack of general illumination. The position of the teat or teats is calculated by a triangulation technique, which is described in detail in WO 97/15900.

When the camera 8 views one or several teats while the teats are illuminated by a flash from the light source, the position of the teats will be found by RGB (Red-Green-Blue) analysis as described in detail in WO 97/15901. Alternatively, they are found by contour analysis, wherein the contour of a typical teat is stored in a memory for a whole herd or of a cow individual and is compared to the contour of the viewed teat.

Figure 4A:
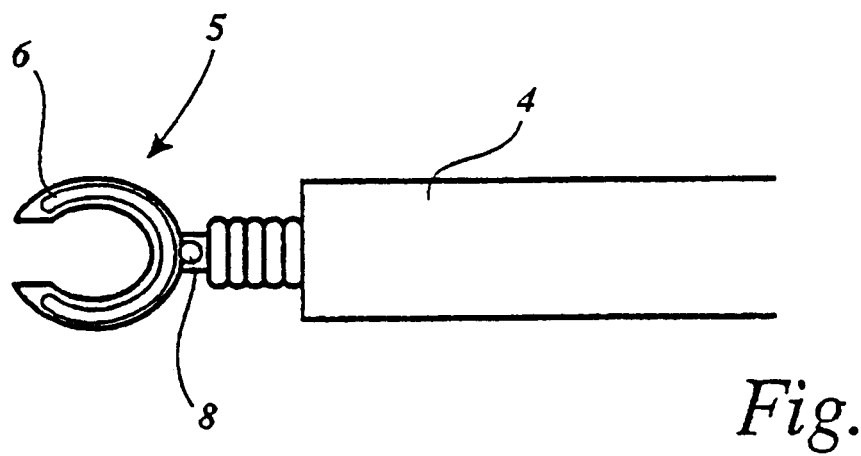
FIGS. 4A and 4B are top views of a robot arm of the animal related apparatus.

In FIG. 4A the a robot arm 4 is provided with handling means 5 with a rigid gripper, i.e. the arms of the gripper are not movable towards one another. A teatcup, teat cleaner, teat sprayer or the like is fetched by insertion of the shackles of the handling means 5 into a suitably formed part thereof.

The handling means is provided with a light source means, which is substantially annular; the annular form has been broken for allowing a teatcup or the like to be inserted between the shackles of the handling means.

The handling means 5 is furthermore provided with a miniature camera 8 or solely a fibre optic lens connected to a camera elsewhere.

Figure 4B:
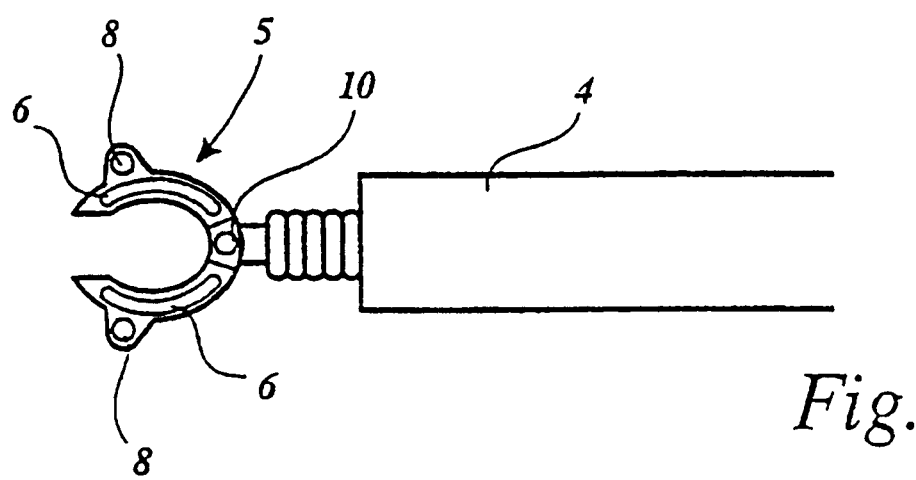

In FIG. 4B, the handling means 5 is provided with movable shackles, which are movable about a joint 10 for performing a grasping action on a teatcup, teat cleaner or the like. Each shackle is provided with a light source means 6 and a pair of miniature camera 8 or a pair of fibre optic lenses connected to a camera placed somewhere else.

The position of the teats will be found by viewing the teats by the camera or cameras 8 and by a suitable image analysis. In the case of two lenses, the parallax phenomenon may be used for determining the exact position.

The light source 6 of FIGS. 4A and 4B may give a constant light in addition to the flashes, for allowing two different kinds of image analysis to be utilised.

The robot arms of FIGS. 4A and 4B are suitable for, but not restricted to, viewing teats from underneath, as the combination of the annular light source and the camera viewing substantially the same direction will provide an image substantially without shadows, when the shackles are placed to surround an axis extending from a protruding part of the animal, such as a teat.

It should be noted that the handling means 5 of the robot arms shown in FIGS. 4A and 4B are turned or tilted in such a way that a teat may be viewed from the side.

Of course, the robot arm of FIG. 4A may be provided with a pair of cameras 8. Furthermore, both the light source means of FIG. 4A and 4B may be divided into several light source members, e.g. a row of ends of fibre optical cables connected to a light source.

Figure 5A:
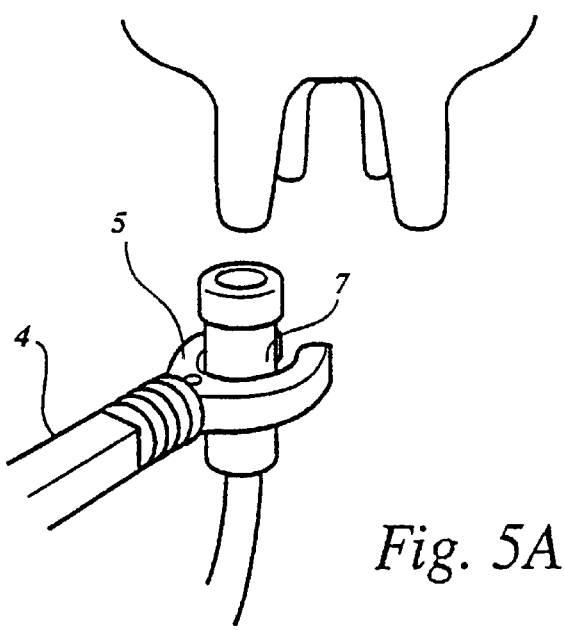
FIGS. 5A and 5B illustrates attachment of a teatcup onto differently oriented teats

FIG. 5A illustrates attachment of a teatcup 7 onto a teat. The position of the teatcup has traditionally been defined as the location of the lower end of the teat.

Figure 5B:
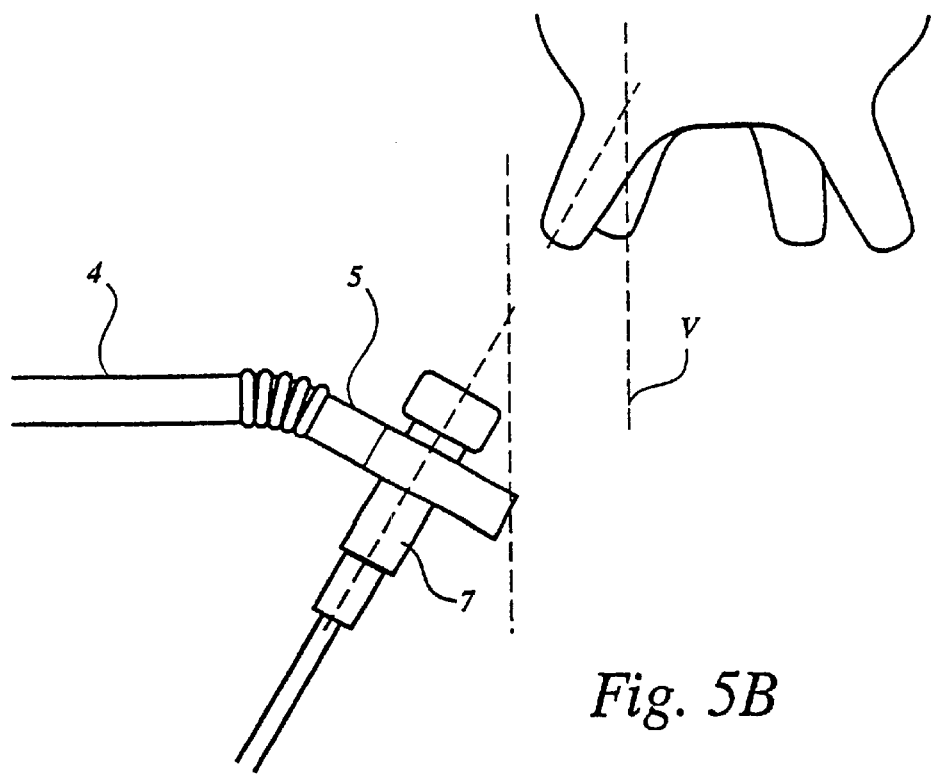

FIG. 5B shows, however, that the orientation of a teat may be inclined in relation to a vertical plane. When trying to attach an upright oriented teatcup onto such an inclined teat, there is a large risk that a teatcup attachment sequence fails.

Consequently, in order to make attachment of a teatcup onto an inclined teat, the handling means 5 of the robot arm 4, or the whole robot arm, is adapted to be turned or tilted for allowing the teatcup 7 to be biased to an orientation substantially similar to that of the teat.

In order to establish the orientation of the teat in relation to a vertical plane V, the image analysis described above is utilised, e.g. by comparing contours of the teat (in FIGS. 5A and 5B, the camera, the light source etc. have been omitted for better understanding of the figures). The orientation of the teat of an animal individual may also be stored in. a memory in a control means associated with a cow identification means, commonly used in the art and therefore not described in further detail.

It should also be noted that wherever an animal related operation is referred to, any kind of relevant operation is meant, such as attaching teatcups to the teats of an animal, cleaning or massaging the teats of an animal, spraying teats after performed milking, brushing the fleece of the hide etc.

OPERATION

A cow standing in an animal space 2 is due to be milked. The robot arm 4 fetches a teatcup 7 and starts a searching procedure for finding the position of a teat. The camera is directed towards an area where the teat is expected to be found. One or several laser lines are projected towards the area.

A cow has four teats, but the camera may capture an image showing more than four lines, due to disturbing factors as the cow's leg, a straw or a bar of the sideward limiting means 2.

In order to quickly establish what lines really represent teats, the light source means is controlled to illuminate the area by a short, intensive light flash.

The now captured high resolution image is analysed by e.g. contour analysis for establishment of the position of the teats, i.e. the laser lines on the disturbing factors need no longer be taken into account.

If the teat is inclined in relation to the vertical plane, the teatcup is biased to substantially the same inclination.

The robot arm is now moved towards a target teat, i.e. a teat onto which a teatcup is to be attached. If needed, further flashes are generated and the inclination of the teatcup is adjusted until the teatcup is attached onto the teat.

The sequence is repeated until a teatcup has been attached to all the teats.

The principle of operation also relates to a combination of RGB-analysis and contour analysis.

Of course, the described sequence also relates to other animal related operations, such as cleaning the teats.

It should furthermore be noted that wherever a cow is mentioned, any milk animal is meant, such as a sheep, a goat, a buffalo or a horse.

What is claimed is:

1. An animal related apparatus for automatically performing an animal related operation, comprising a robot arm, a camera means provided with at least one lens and a light source means, characterized in that:

said camera means is arranged on said robot arm;

a paid light source means is arranged in relation to said camera means such that an object to be viewed is illuminated from substantially the same direction as it is viewed;

and in that:

said light source means is a flash light means adapted to supply at least one short, intensive light flash for illumination of a part of an animal to be viewed by said camera means.

2. An animal related apparatus according to claim 1, wherein said light source means is arranged on the robot arm.

3. An animal related apparatus according to claim 2, wherein:

a said light source means is adapted to supply a plurality of light flashes in a sequence;

said light source means is provided with a reflector for providing a directed light beam;

said light source means is of a substantially annular shape for initially forming a substantially annular light beam;

at least a laser emitter is provided to project at least one laser line onto said part of the animal, for illumination thereof;

an image capture means of said camera means is associated with a shape recognition means;

said shape recognition means is adapted to identify said part of the animal by contour analysis;

at least a part of said robot arm is adapted to bias a teatcup to an orientation substantially similar to that of an inclined teat.

4. An animal related apparatus according to claim 1, wherein said light source means is adapted to supply a plurality of light flashes in a sequence.

5. An animal related apparatus according to claim 1, wherein said light source means is provided with a reflector for providing a directed light beam.

6. An animal related apparatus according to claim 1, wherein said light source means is of a substantially annular shape for initially forming a substantially annular light beam.

7. An animal related apparatus according to claim 1, wherein at least a laser emitter is provided to project at least one laser line onto said part of the animal, for illumination thereof.

8. An animal related apparatus according to claim 1, wherein an image capture means of said camera means is associated with a shape recognition means.

9. An animal related apparatus according to claim 8, wherein said shape recognition means is adapted to identify said part of the animal by contour analysis.

10. An animal related apparatus according to claim 1, wherein at least a part of said robot arm is adapted to bias a teatcup to an orientation substantially similar to that of an inclined teat.

11. An animal related apparatus according to claim 1, wherein the object to be viewed comprises a portion of an animal to be viewed.

12. A method of performing an animal related operation including an animal related apparatus according to anyone of the preceding claims, characterized by the following sequence:

directing said camera means and said light source means towards a part of an animal by means of a robot arm;

controlling said light source means to supply at least one short intensive light flash;

analyzing a captured image for establishing the position of said part of the animal;

moving said robot arm at least partly towards said part of the animal;

performing an animal related operation in case the part of the animal has been safely identified; and in case the robot arm has moved sufficiently close to the part of the animal to allow said animal related operation to be performed.

13. A method according to claim 12, including repeating said sequence until the part of the animal has been safely identified; and the robot arm has moved sufficiently close to the part of the animal to allow said animal related operation to be performed.

14. A method according to claim 13, including:

utilizing a combination of at least two kinds of image analysis;

controlling a second light source, such as a laser source, to illuminate said part of the animal;

establishing the orientation in relation to a vertical plane, in case said captured image is recognized to be a teat; and adjusting the orientation of a teatcup to be attached onto said teat to an orientation substantially similar to that of the teat, before attachment of the teatcup onto the teat, and thereafter attaching the teatcup onto the teat.

15. A method according to claim 12, including utilizing a combination of at least two kinds of image analysis.

16. A method according to claim 12, including controlling a second light source, such as a laser source, to illuminate said part of the animal.

17. A method according to claim 12, including establishing the orientation in relation to a vertical plane, in case said captured image is recognized to be a teat.

18. A method according to claim 17, including adjusting the orientation of a teatcup to be attached onto said teat to an orientation substantially similar to that of the teat, before attachment of the teatcup onto the teat, and thereafter attaching the teatcup onto the teat.

* * * * *

UNITED STATES PATENT AND TRADEMARK OFFICE
CERTIFICATE OF CORRECTION

PATENT NO. : 6,363,883 B1
DATED : April 2, 2002
INVENTOR(S) : Uzi Birk

It is certified that error appears in the above-identified patent and that said Letters Patent is hereby corrected as shown below:

Column 1,
Line 49, "animnal" should read -- animal --; and

Column 5,
Line 13, "a paid light source" should read -- said light source --.

Signed and Sealed this

Eleventh Day of February, 2003

JAMES E. ROGAN
*Director of the United States Patent and Trademark Office*